(12) United States Patent
Hadden et al.

(10) Patent No.: US 8,739,519 B2
(45) Date of Patent: Jun. 3, 2014

(54) MULTI-TIERED TELESCOPE SHAPED ATOMIZER

(75) Inventors: Robert Glenwood Hadden, Livonia, MI (US); Terry Jadan, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 13/449,160

(22) Filed: Apr. 17, 2012

(65) Prior Publication Data

US 2013/0269325 A1 Oct. 17, 2013

(51) Int. Cl.
*F01N 3/04* (2006.01)

(52) U.S. Cl.
USPC .................... 60/317; 60/295; 60/301; 60/310; 60/324

(58) Field of Classification Search
USPC ........... 60/286, 295, 301, 303, 310, 317, 324; 366/338, 340
See application file for complete search history.

(56) References Cited

U.S. PATENT DOCUMENTS

| | | | |
|---|---|---|---|
| 4,142,413 A | 3/1979 | Bellinga | |
| 4,614,440 A * | 9/1986 | King | 366/336 |
| 6,516,610 B2 | 2/2003 | Hodgson | |
| 6,568,845 B1 * | 5/2003 | Harada | 366/340 |
| 7,165,393 B2 | 1/2007 | Betta et al. | |
| 7,240,483 B2 | 7/2007 | Cizeron et al. | |
| 7,377,102 B2 | 5/2008 | Roach et al. | |
| 7,510,172 B2 * | 3/2009 | Kojima | 261/79.2 |
| 7,581,387 B2 | 9/2009 | Bui et al. | |
| 7,814,745 B2 | 10/2010 | Levin et al. | |
| 7,856,807 B2 | 12/2010 | Gibson | |
| 2002/0103368 A1 | 8/2002 | Hodgson | |
| 2003/0007419 A1 * | 1/2003 | Goebel et al. | 366/336 |
| 2008/0087013 A1 * | 4/2008 | Crawley et al. | 60/320 |
| 2009/0266064 A1 * | 10/2009 | Zheng et al. | 60/317 |
| 2010/0005791 A1 * | 1/2010 | Ranganathan et al. | 60/310 |
| 2011/0167810 A1 * | 7/2011 | Lebas et al. | 60/324 |
| 2012/0151902 A1 * | 6/2012 | Yi et al. | 60/301 |
| 2013/0242692 A1 * | 9/2013 | Soukup | 366/340 |

FOREIGN PATENT DOCUMENTS

EP 1712753 A2 4/2006

* cited by examiner

*Primary Examiner* — Thomas Denion
*Assistant Examiner* — Jorge Leon, Jr.
(74) *Attorney, Agent, or Firm* — Julia Voutyras; Alleman Hall McCoy Russell & Tuttle LLP (57) ABSTRACT

In one example, a system is provided, comprising an exhaust reductant injector upstream of a mixer. The mixer includes a plurality of concentrically smaller rings interconnected via fins having a width varying in a flow direction, the fins arranged annularly, and with a first set of fins between a first pair of adjacent rings angularly offset from a second set of fins between a second pair of adjacent rings, the first and second pairs of rings sharing one common ring. In this way, it is possible to atomize, redirect, and mix the exhaust flow over a short distance to effectively react with NOx in a downstream SCR catalyst.

20 Claims, 9 Drawing Sheets

MULTI-TIERED TELESCOPE SHAPED ATOMIZER

BACKGROUND

A technology such as Sel environment via exhaust passage 168. Note that while not illustrated by FIG. 1, exhaust system 100 may include a particulate filter and/or diesel oxidation catalyst arranged upstream or downstream of catalyst 140. Furthermore, it should be appreciated that exhaust system 100 may include two or more catalysts.

Figure 1:
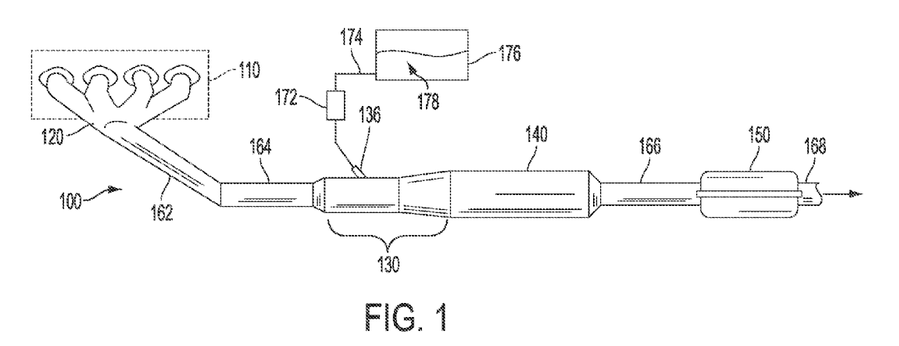

In some embodiments, mixing region 130 may include a greater cross-sectional area or flow area than upstream exhaust passage 164. Mixing region 130 may include an injector 136 for selectively injecting a liquid into the exhaust system. As shown in FIG. 1, injector 136 may be angled to inject liquid obliquely toward the mixer. Alternatively, injector 136 may be positioned in-line with the mixer to inject liquid along the direction of exhaust flow. In one non-limiting example, the liquid injected by injector 136 may include a liquid reductant 178 such as ammonia or urea. The liquid reductant 178 may be supplied to injector 136 through conduit 174 from a storage tank 176 via an intermediate pump 172. Mixing region 130 may also include an exhaust system atomizer 200, as described in further detail with regard to FIGS. 2-9. Note that catalyst 140 can include any suitable catalyst for reducing NOx or other products of combustion resulting from the combustion of fuel by engine 110.

With regards to vehicle applications, exhaust system 100 may be arranged on the underside of the vehicle chassis. Additionally, it will be appreciated that the exhaust passage may include one or more bends or curves to accommodate a particular vehicle arrangement. Further still, it will be appreciated that in some embodiments, exhaust system 100 may include additional components not illustrated in FIG. 1 and/or may omit components described herein.

Figure 2:
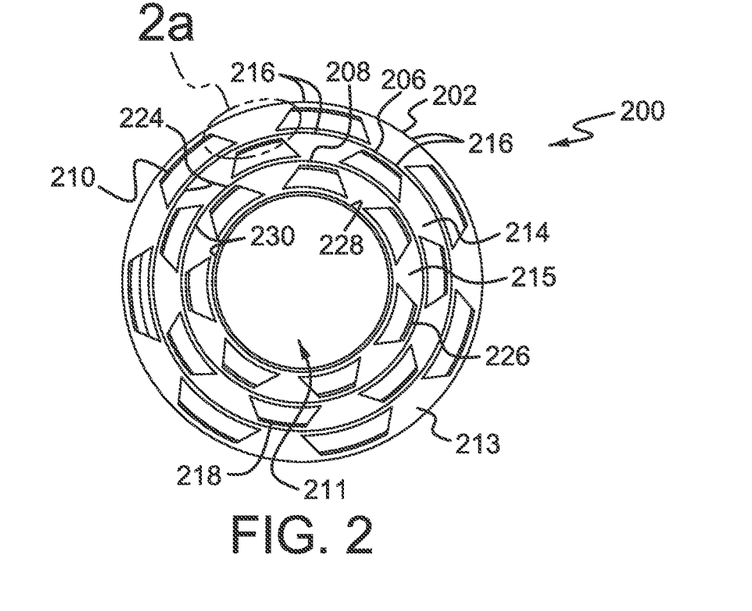
Figure 3:
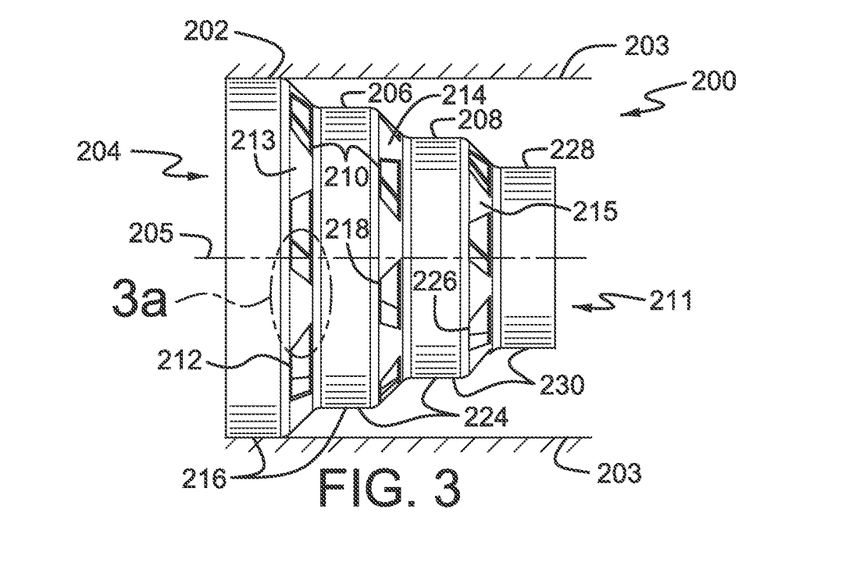
Figure 3A:
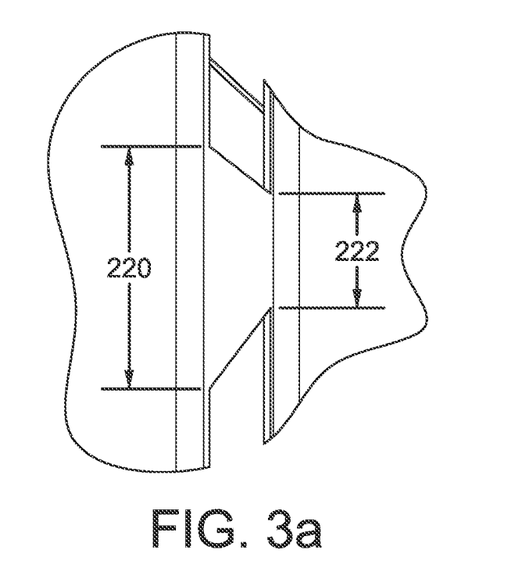
Figure 4:
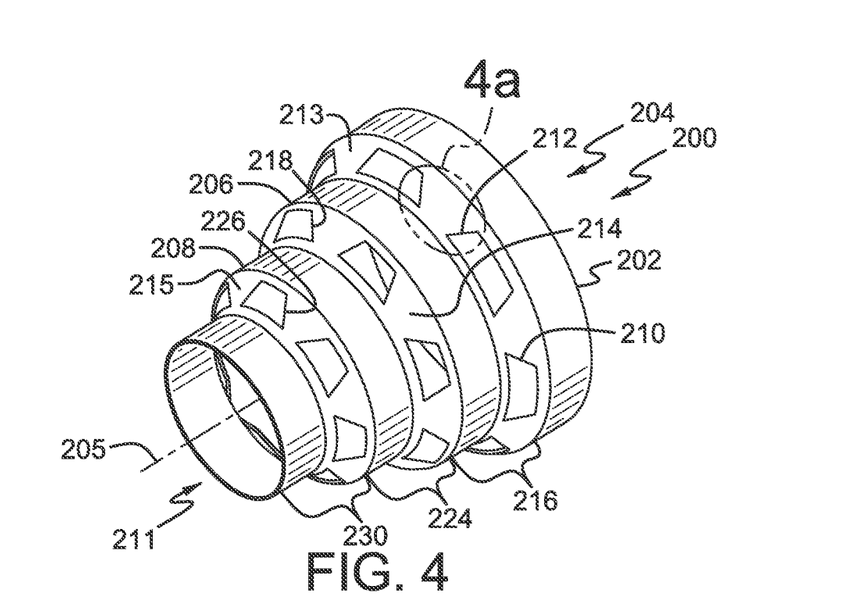
Figure 4A:
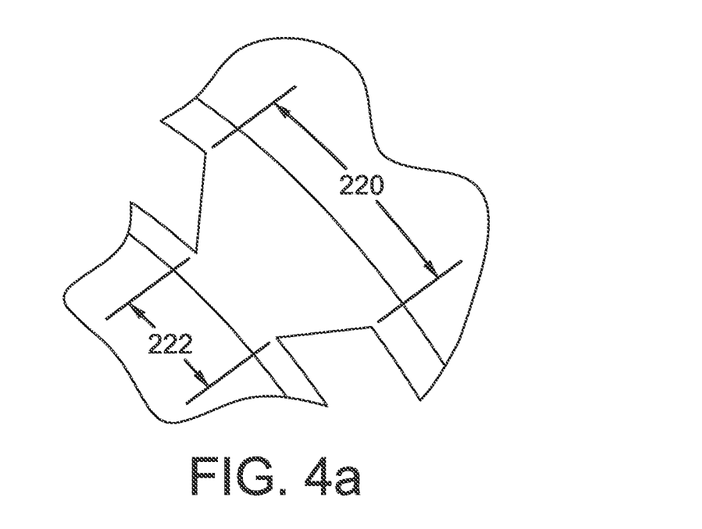

FIGS. 2-9 illustrate various additional details of a portion of the exhaust passage for receiving engine exhaust gas, including exhaust system atomizers 200, 300, and 400, and 500, each of which may be located inside mixing region 130. For example, each of the exhaust system atomizers may be positioned internally to (e.g., press-fit into) an exhaust pipe (e.g., exhaust passage 164 in FIG. 1) of engine 110 such that its outer edge is contiguous and in face-sharing contact with an inner wall 203 of mixing region 130, as seen in FIG. 3.

FIG. 2 shows a face-on view of an example embodiment of an exhaust system atomizer 200, which may also be referred to as a mixer. The atomizer 200 comprises an array of circular rings 202, 206, 208 and 228, positioned in a telescope-shaped configuration with diameters decreasing in a flow direction. A first ring 202 is arranged at a furthermost upstream position, and defines an interior passage inlet 204 configured to receive engine exhaust gas. Downstream of first ring 202 is provided a second ring 206, having a diameter less than that of first ring 202. Further downstream of second ring 206 is provided a third ring 208 having a diameter less than that of first and second rings 202 and 206. Finally, a fourth ring 228, having a diameter less than that of rings 202, 206 and 208, is provided at a furthermost downstream position, and defines an interior passage outlet 211. Rings 202, 206, 208 and 228 in totality are arranged directly downstream of one another, share a portion of an interior passage defined by inlet 204 and outlet 211, and are aligned concentrically about a common central axis 205. Thus, in such an example, all rings are concentric to one another. Central axis 205 may be concentric with the central axis of the exhaust pipe (e.g., exhaust passage 164 in FIG. 1), such that a central axis of each ring and central axis 205 aligns with the central axis of the exhaust pipe.

The array of concentric rings (e.g., 202, 206, 208 and 228 in FIG. 2) may share a variety of common attributes. One non-limiting example may include thickness, wherein thickness is a measurement of length along central axis 205. As they are arranged progressively downstream in the direction of exhaust flow, ring diameters may be reduced by a constant factor; e.g., the diameter of the third ring 208 arranged concentrically downstream the second ring 206 may be 20% less than that of the second ring 206, while the diameter of the second ring 206 may also be 20% less than that of the first ring 202, and so on. However, it will be appreciated that this is a non-limiting example and that diameter differences may vary among ring pairs or by a number of different factors.

The atomizer of the present disclosure may be formed integrally as one single piece. Alternatively, portions of the atomizer may be separately formed and subsequently connected. As shown in FIGS. 2-9, rings (e.g., 202, 206) may be interconnected via peripherally positioned fins (e.g., 213, 214 and 215), which may be coupled to the periphery (e.g., outer edge) of the rings. Fins, in one example, include interconnecting portions (that may be formed of a metal) which force exhaust flow to proceed through other regions of the atomizer 200. Fins may be formed integrally as a single unit in themselves, may be formed integrally with adjacent rings together as a single unit or may be individually formed and subsequently connected to other portions of the atomizer. If the atomizer is not formed integrally as a single unit, fins may be attached to the rings by a variety of methods (e.g., welding).

In some embodiments, such as shown in FIG. 2 via atomizer 200, some or all of the fins are positioned annularly in a ring-shaped formation and angle inwards towards central axis 205 in a downstream direction and also towards the smallest ring (e.g., fourth ring 228) in the atomizer 200. Fins may be flat and angle inwards at an acute angle, or may have curvature. Fins may also share a number of common attributes, including thickness. As one non-limiting example, fin thickness may or may not be equivalent to ring thickness, or may vary among the pairs to which they are attached.

The rings and fins together form annularly arranged apertures (e.g., 210), as shown, for instance, in FIG. 2. Apertures include hollow regions through which exhaust gas flows. In the example embodiments provided, some or all of the apertures (e.g., 210) are equally spaced annularly from one another, though unequal spacing may be possible as well. As shown in FIGS. 2-9, apertures may include non-hollow regions between rings and aperture bases, where aperture bases are portions corresponding substantially to ring arcs and are perpendicular to central axis 205. Thus, the bases of apertures may not correspond directly to an outer edge of a ring, and some material (e.g., metal) may be included between aperture bases and ring edges.

At least a portion of mixing region 130 in FIG. 1 comprises a ring (e.g., first ring 202) whose surface normal vector is parallel to the exhaust flow direction. As described above, the exhaust gas leaving the engine may first enter mixing region 130, wherein a fluid such as a liquid reductant (e.g., ammonia, urea, etc.) is injected into the exhaust system via the injector 136 as illustrated in FIG. 1. Rings (e.g., 202 and 206) along with fins (e.g., 213), in one example, may be constructed of a type of metal, in which case they will be heated by exhaust flow. The liquid injection, which may be of various angles including in-line with exhaust flow or oblique with respect to exhaust flow, in combination with the flow generated by the fins and apertures, guides exhaust flow around and through exhaust system atomizer 200. Further, vaporized liquid, which may be vaporized by the hot metal of the rings and fins, is drawn off exhaust system atomizer 200. Thus, exhaust system atomizer 200 aids in further mixing of the engine exhaust gas before the engine exhaust gas reaches SCR catalyst 140. In this way, by better mixing the engine exhaust gas, performance of SCR catalyst 140 may be further enhanced, and thus, NOx may be further reduced.

In some embodiments, the fins of atomizer 200 may be considered as geometrically complementary to their adjacent apertures, in which case many of the fin properties discussed below imply consequent aperture properties and vice versa. As seen, for example in FIG. 2, both the apertures (e.g., 210) and fins (e.g. 213) occupy annular regions defined by pairs of rings (e.g., the annular region between and defined by first ring 202 and second ring 206). In such an embodiment, both the apertures and fins may be trapezoidal-shaped with curved bases. Other embodiments, however, are possible wherein fin and apertures may resemble alternative geometries (e.g., rectangular, circular).

Figure 2A:
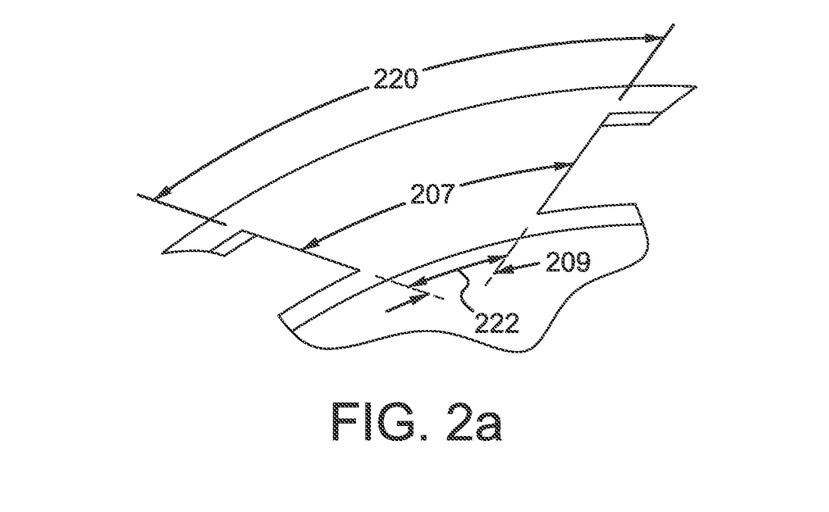

Fins (e.g., 213) have a first connecting region 220, defined by an arc of an upstream ring (e.g. an arc of first ring 202), and a second connecting region 222 defined by an arc of a downstream ring (e.g., an arc of second ring 206), both connecting regions shown in FIG. 2A. In this non-limiting example, the arc to which first connecting region 220 corresponds is a portion of the outer edge of first ring 202. Likewise, the arc to which second connecting region 222 corresponds is a portion of the outer edge of second ring 206. Such arcs may be called connection arcs, their lengths being designated connection arc lengths. This arrangement is seen in FIGS. 2 and 2A, while FIG. 3 shows that the fins may be attached to the sidewalls of their respective rings. In other embodiments, fins may also be coupled to the top or bottom edges of the adjacent upstream/downstream rings. With the exception of FIG. 8A, FIGS. 2A, 3A, 4A, 5A, 6A, 7A and 9A show embodiments wherein the length of second connecting region 222 is less than that of first connecting region 220. The difference between the lengths may be constant for all fins in the atomizer 200, or may vary among the annular regions in the atomizer 200. Alternative embodiments may be possible in which the length of second connecting region 222 of the fins is greater than the length of first connecting region 220, as shown in FIG. 8A.

In one embodiment, the sides of fins are defined by line segments propagating from an upstream ring (e.g., first ring 202) to a downstream ring (e.g., second ring 206), the line segments being separated by an arc length 207, shown in FIG. 2A, concentric to all rings and central axis 205. An angle 209, also shown in FIG. 2A, sweeps out the arc length, wherein the angle 209 may be constant for all fins. The width of the fins, characterized by arc lengths whose endpoints correspond to the midpoints of the sides of the fins, may vary along the direction of exhaust flow, forming a tapered shape as seen in FIGS. 2-9. It will be appreciated, however, that other embodiments are possible in which the sides of fins cannot be parameterized by rays extending from the central axis 205 to a fin base, or by line segments propagating from an upstream ring to a downstream ring. In other words, it is possible that fin sides are not straight and do not project radially outward. Instead, in a non-limiting example, fin sides may be curved and may have parabolically-shaped edges, for instance.

As shown at least at FIG. 2, fins (e.g., 213) connect first ring 202 to second ring 206, the rings together forming a first pair of rings 216. A first set of apertures 212 is included in this annular region, where the first set of apertures includes the aperture denoted by reference numeral 212 and the other apertures in the annular region between and defined by first ring 202 and second ring 206. In one embodiment, the first set of apertures 212 may comprise the same number of apertures as a second set of apertures 218, the second set of apertures 218 including apertures in the annular region between and defined by second ring 206 and third ring 208. Similarly, the number of fins provided among the first set of apertures 212 in its corresponding annular region may be equal to the number of fins provided among the second set of apertures 218 in its corresponding annular region.

Fins (e.g., 213) in the annular region between and defined by first ring 202 and second ring 206 form a first set of fins. Similarly, fins (e.g., 214) in the annular region between and defined by second ring 206 and third ring 208 form a second set of fins. Still further, fins (e.g., 215) in the annular region between and defined by third ring 208 and fourth ring 228 form a third set of fins. In such an embodiment, alternating fins from the first and second sets of fins are connected around a periphery of a common ring (e.g., second ring 206). Geometrically, it may be that the first set of fins does not overlap the second set of fins. More specifically, in such a case no points in a second connecting region (e.g., 222) of a fin in the first set of fins are shared with the points in a first connecting region (e.g., 220) of a fin in the second set of fins. Alternatively phrased, no points in the shorter base of a fin in the first set of fins correspond to points in the opposing base of a fin in the second set of fins. In this case, the first set of fins between a first pair of adjacent rings (e.g., 216) and the second set of fins between a second pair of adjacent rings (e.g., 224) are angularly offset, the first and second pairs of rings sharing one common ring (e.g., second ring 206). Alternatively stated, connection arc lengths from the first and second sets of fins do not overlap on the common ring (e.g., 206), the second set downstream from the first set. On the other hand, points in a first and/or second connecting region of a fin in the first set of fins may correspond to points in a first and/or second connecting region of a fin in the third set of fins, the correspondence being that a ray extending from central axis 205 would intersect points in a first and/or second connecting region of a fin in the third set of fins in addition to points in a first and/or second connecting region of a fin in the first set of fins. This is shown in the face-on view of FIG. 2. Moreover, the correspondence may be such that a ray extending from central axis 205 would intersect the midpoint of a first and/or second connecting region of a fin in the third set of fins in addition to the midpoint of a first and/or second connecting region of a fin in the first set of fins. In such a case the first set of fins and the third set of fins would be said to be aligned.

The width of fins in a set of fins, compared to those in a set of fins located upstream, may be less (e.g., the width of fins in the third set of fins may be less than the width of fins in the second set of fins, as shown in FIG. 2). More specifically, connection arc lengths coinciding with a first and second connecting region may be longer for fins in the second set of fins than those for fins in the third set of fins. Thus connection arc lengths on an upstream ring of the first pair of rings may differ from connection arc lengths on an upstream ring of the second pair. Moreover, fin lengths may vary as the atomizer (e.g., 200) is traversed along the direction of exhaust flow. This may especially be the case if the distances separating rings vary. Still further, fin inclination, as measured by the angle between a first and second connecting region (e.g., 220 and 222 in FIG. 2A) may also vary. This may especially be the case if ring diameters are not reduced by a constant factor as the atomizer is traversed along the direction of exhaust flow. In addition, fin geometry may be curved along the direction of exhaust flow. Alternatively, fins may be straight, minimizing length along the direction of exhaust flow. However, certain commonalities may exist among the sets or entire plurality of fins, including tapered geometry, curved geometry towards central axis 205, material composition and thickness.

In some embodiments, second ring 206 and third ring 208 together form a second pair of rings 224. First pair of rings 216 and second pair of rings 224 share a common ring, namely second ring 206. Further, a fourth ring 228 may be arranged downstream of third ring 208. Third ring 208 and fourth ring 228 together form a third pair of rings 230. Second pair of rings 224 and third pair of rings 230 share a common ring, namely third ring 208. In totality, such an embodiment comprises, among other elements, exactly three pairs of rings, a total of four rings, three sets of apertures and fins, the rings being disposed concentrically about a central axis 205 and progressively downstream of one another with decreasing size in the direction of exhaust flow. FIGS. 2-4, 8 and 9 represent this arrangement, though it will be understood that this is merely an illustrative example and that different numbers of rings, fins, apertures and sets of apertures may be used without departing from the scope and spirit of the present disclosure.

Figure 5:
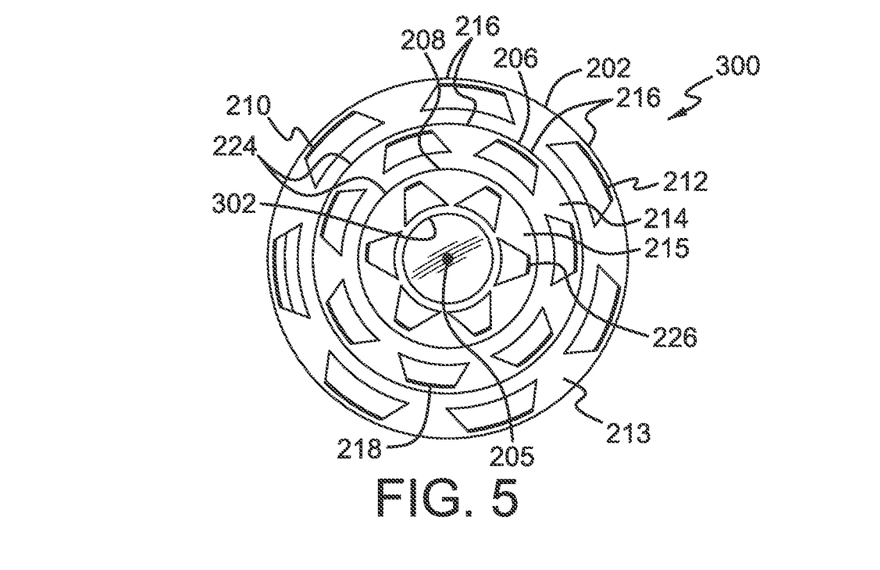
Figure 5A:
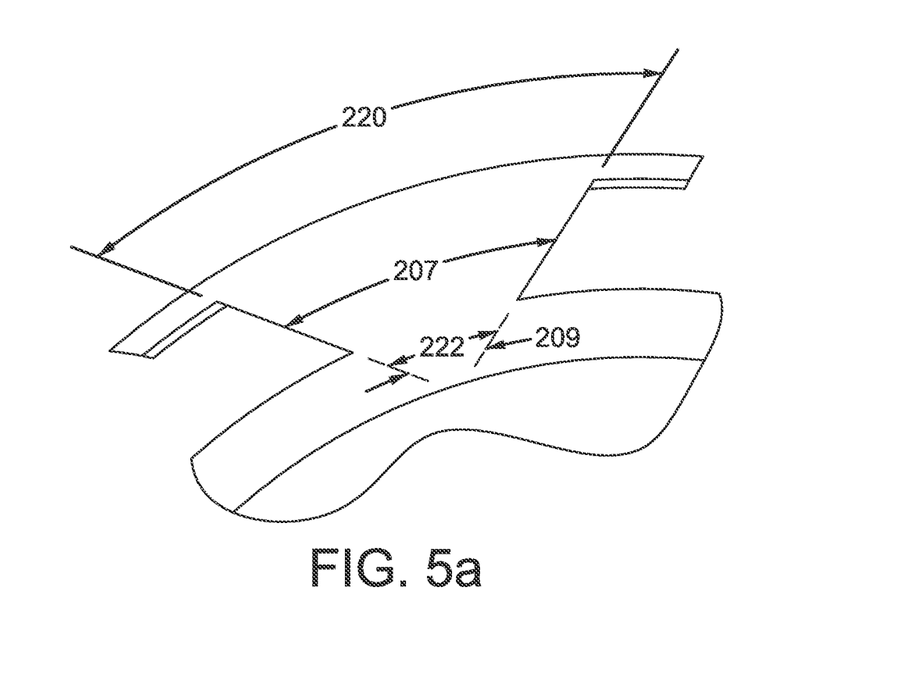
Figure 6:
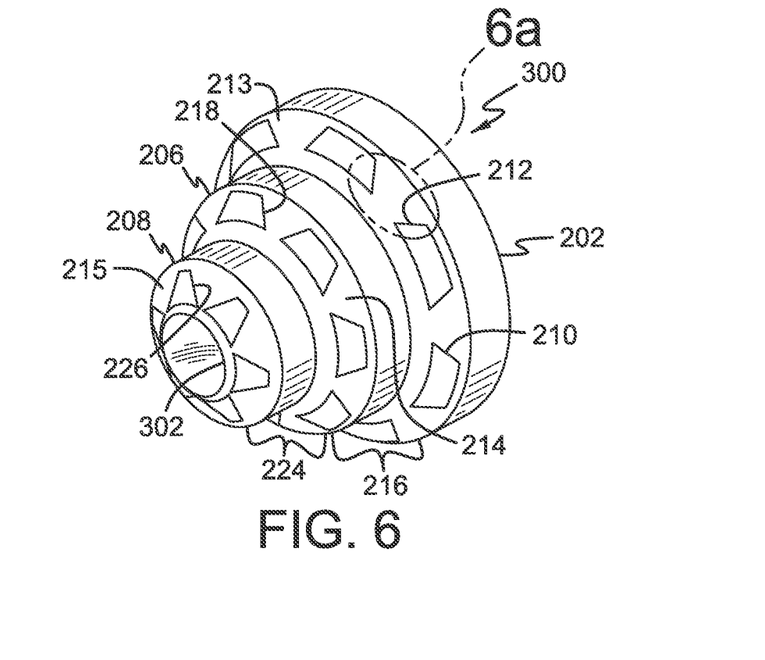
Figure 6A:
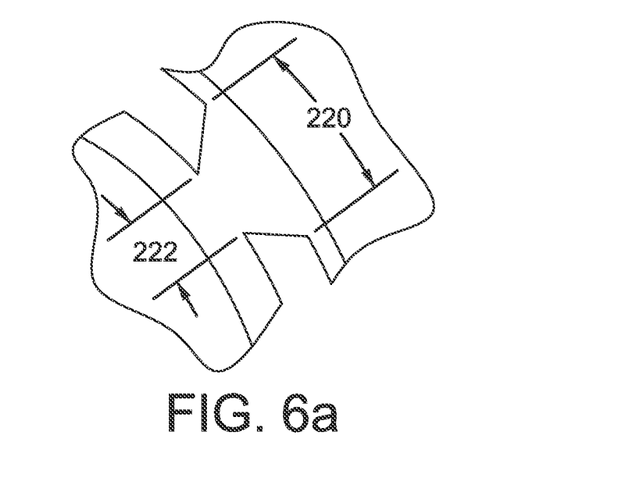
Figure 7:
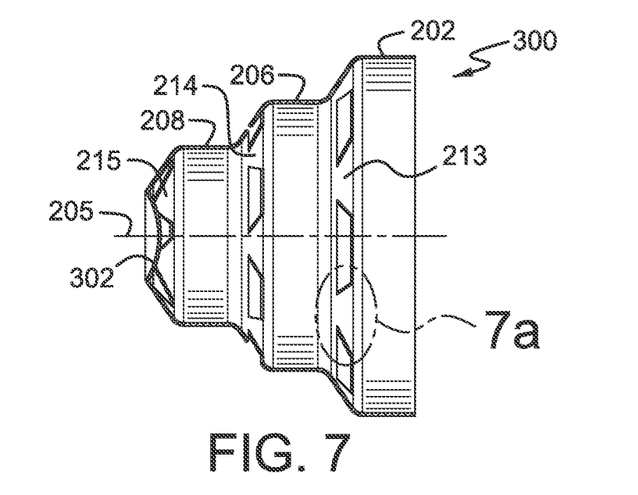
Figure 7A:
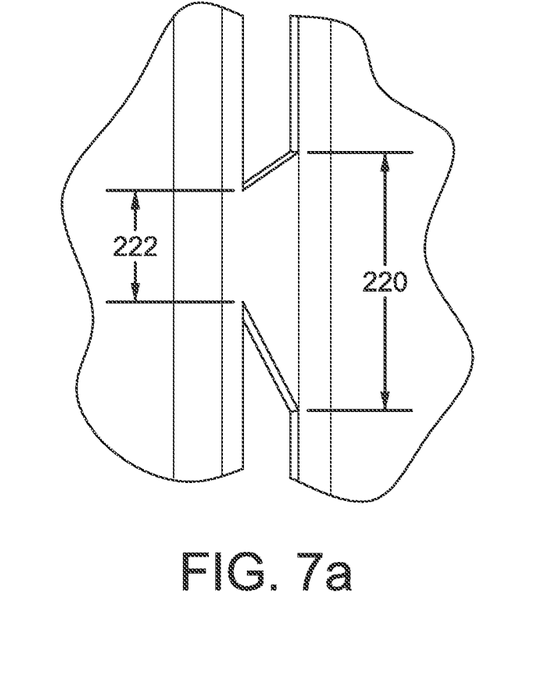

Alternative embodiments including three rings, for example, are shown in FIGS. 5-7. In this example, an exhaust system atomizer 300 comprises three rings, two pairs of rings, three sets of apertures and fins, and a convex disk 302. As in the embodiments shown in FIGS. 2-4, the length of a second connecting region 222 of the fins is less than the length of a first connecting region 220, creating a trapezoidal fin shape. Unlike the embodiments heretofore disclosed, the convex disk 302 is positioned in a most upstream ring (e.g., third ring 208) and facing exhaust flow. The convex disk 302 has a curvature wherein a point coinciding with its central axis 205 is closer to a first ring 202 than points further away from central axis 205. The convex disk 302 may be attached to third ring 208 by a variety of methods (e.g., welding), or, as similarly disclosed above, the exhaust system atomizer 300 may be integrally formed as one unit. The convex disk 302 forces airflow to proceed through apertures 210. In other words, no airflow may pass through third ring 208 but may flow around it and through its apertures.

Figure 8:
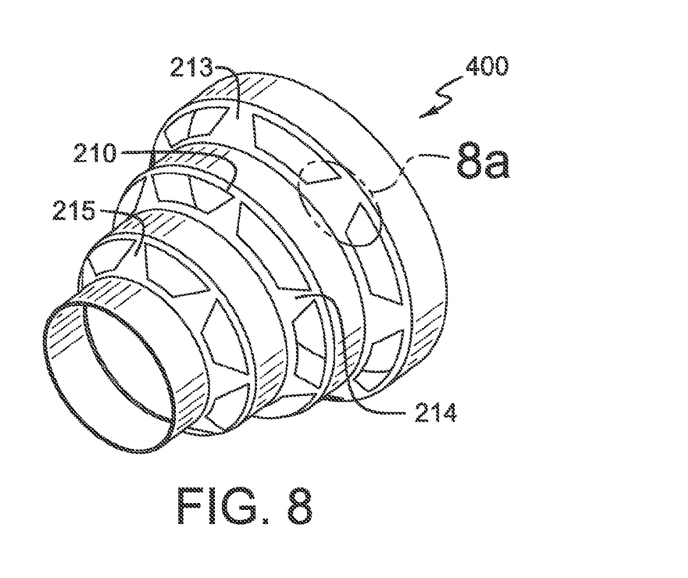
Figure 8A:
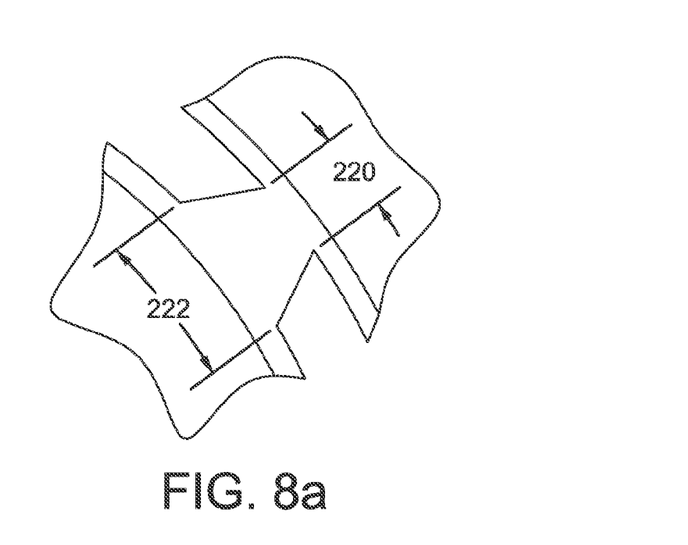
Figure 9:
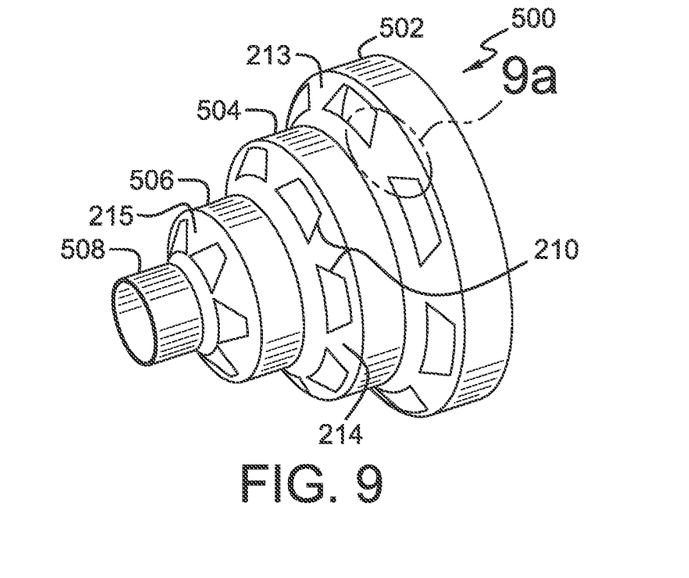
Figure 9A:
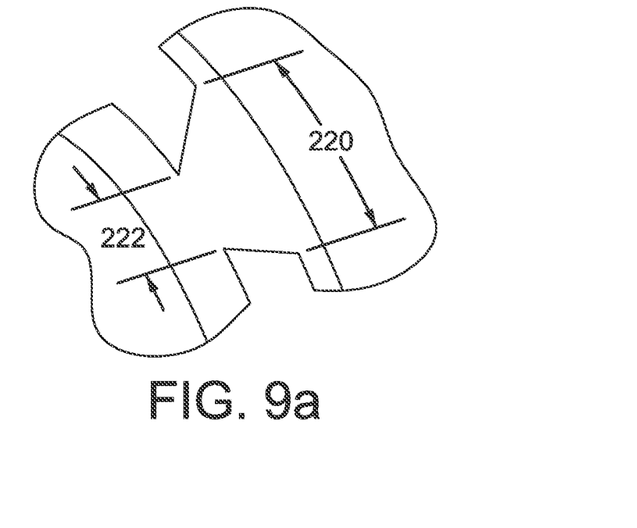

FIGS. 8 and 9 further illustrate alternative embodiments of exhaust gas atomizers in accordance with the present disclosure. FIG. 8. shows an atomizer 400 much like the atomizer 200 shown in FIGS. 2-4. In this embodiment, however, FIG. 8A shows that the length of a first connecting region 220 is less than the length of a second connecting region 222 for the fins (e.g., 213) in atomizer 400, creating a trapezoidal fin shape. Conversely, FIG. 9A shows a portion of an atomizer 500 wherein lengths of a first connecting region 220 are greater than the lengths of a second connecting region 222 for the fins (e.g., 213). Moreover, FIG. 9 shows that alternative dimensioning is possible. For example, ring thickness may be greater than the thicknesses shown in other embodiments, and rings may be separated by a greater distance, increasing the fins' angle of inclination. Further, FIG. 9 shows that unequal ring thickness may be possible. In this example, the thickness of a fourth ring 508, as measured along the direction of exhaust flow, is greater than preceding rings 502, 504 and 506.

Thus, the claimed configuration allows for atomization to still be achieved, yet with a reduced impact to weight and cost. Exhaust system atomizer 200 may redirect a majority of the engine exhaust gas, whereas in some embodiments a minority of the engine exhaust gas may flow unobstructedly through the atomizer. This minority amount of the engine exhaust gas flowing unobstructedly may be offset by the cost and weight savings achieved by the atomizer. Further, exhaust back pressure effects can be reduced.

In this way, exhaust system 100 can achieve good atomization and mixing, while allowing for packaging space to be reduced. For example, in comparison to traditional exhaust systems, exhaust system 100 comprising exhaust system atomizer 200 can facilitate parabolic flow, straighten the flow pattern and maximize mixing efficiency. The fins increase surface area, catching liquid droplets and allowing increased mixing into turbulent exhaust flow.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal or different in scope to the original claims, also are regarded as included within the subject matter of the present disclosure.

The invention claimed is:

1. A system, comprising:
   an exhaust reductant injector upstream of a multi-tiered mixer including:
      a plurality of concentric rings having decreasing diameters in a flow direction and interconnected at ring sidewalls via annularly arranged fins and with a first set of fins between a first pair of adjacent rings angularly offset from a second set of fins between a second pair of adjacent rings, the first and second pairs of rings sharing one common ring.

2. The system of claim 1 wherein the plurality of concentric rings includes three or more pairs of adjacent rings and wherein the first set and second set of fins have a width varying in the flow direction.

3. The system of claim 1 wherein alternating fins from the first and second sets are connected around a periphery of the common ring and wherein annularly arranged apertures are formed by the rings and fins of the first and second set of fins, the apertures including hollow regions through which exhaust gas flows, each aperture formed between two adjacent rings and two adjacent fins.

4. The system of claim 1 wherein the fins angle inward toward a central axis of an exhaust pipe in which the multi-tiered mixer is positioned, where a central axis of concentric rings share a central axis of the exhaust pipe.

5. The system of claim 1 wherein connection arc lengths on an upstream ring of the first pair of rings differ from connection arc lengths on an upstream ring of the second pair of rings.

6. The system of claim 1 wherein connection arc lengths from the first and second sets of fins do not overlap on the common ring, the second set downstream from the first set.

7. The system of claim 1 wherein each fin has a first connecting region defined by an arc of an upstream ring, a second connecting region defined by an arc of a downstream ring, each fin also having a common thickness.

8. The system of claim 1 wherein a number of fins in the first set is equal to a number of fins in the second set.

9. The system of claim 1 further comprising a convex disk facing exhaust flow positioned in a most upstream ring.

10. The system of claim 1 wherein an SCR catalyst is positioned downstream of the multi-tiered mixer.

11. A system, comprising:
an exhaust reductant injector upstream of a multi-tiered mixer including:
a plurality of concentric rings having decreasing diameters in a flow direction and interconnected at ring sidewalls via fins arranged annularly, the fins and rings forming apertures arranged annularly, and with a first set of fins and first set of apertures between a first pair of adjacent rings angularly offset from a second set of fins and a second set of apertures between a second pair of adjacent rings, the first and second pairs of rings sharing one common ring, with alternating fins from the first and second sets connected around a periphery of the common ring.

12. The system of claim 11 wherein the plurality of concentric rings includes three or more pairs of adjacent rings.

13. The system of claim 11 wherein all of the fins angle inward toward a central axis of an exhaust pipe in which the multi-tiered mixer is positioned, where a central axis of concentric rings share a central axis of the exhaust pipe.

14. The system of claim 13 wherein connection arc lengths on an upstream ring of the first pair of rings differ from connection arc lengths on an upstream ring of the second pair of rings.

15. The system of claim 14 wherein connection arc lengths from the first and second sets of fins do not overlap on the common ring, the second set downstream from the first set.

16. The system of claim 13 wherein a number of fins in the first set of fins is equal to a number of fins in the second set of fins, and wherein a number of apertures in the first set of apertures is equal to a number of apertures in the second set of apertures, and an SCR catalyst is positioned downstream of the multi-tiered mixer.

17. A system, comprising:
an exhaust pipe;
an angled exhaust injector positioned in a wall of the exhaust pipe;
an SCR catalyst coupled in the exhaust pipe; and
a mixer positioned internally to the exhaust pipe downstream of the injector and upstream of the SCR catalyst, an outer edge of the mixer contiguous and in face-sharing contact with the wall of the exhaust pipe, the mixer including a multi-tiered telescope-shaped set of three or more rings, with progressively smaller diameter rings positioned downstream of one another, adjacent rings connected via peripherally positioned flat angled fins, the fins attached to sidewalls of the adjacent rings, the mixer including apertures formed between adjacent fins in an annular region defined by adjacent rings.

18. The system of claim 17 wherein the exhaust pipe is coupled to an exhaust of a diesel engine, wherein ring sets are coupled to one another via the fins, and wherein the apertures include hollow regions through which exhaust gas flows.

19. The system of claim 18 wherein each set of rings is coupled with a same number of fins and wherein adjacent fins between each set of rings are separated by one aperture of the apertures.

20. The system of claim 18 wherein a central axis of each ring aligns with a central axis of the exhaust pipe.

\* \* \* \* \*